United States Patent [19]

Kim et al.

[11] Patent Number: 5,220,465
[45] Date of Patent: Jun. 15, 1993

[54] CIRCUIT AND METHOD FOR REPRODUCING A LUMINANCE SIGNAL COMPATIBLY BETWEEN DIFFERENT VIDEO SYSTEMS

[75] Inventors: Yong-je Kim; Hun-sun Choi, both of Suwon, Rep. of Korea

[73] Assignee: SamSung Electronics Co., Ltd., Suwon, Rep. of Korea

[21] Appl. No.: 737,971

[22] Filed: Jul. 30, 1991

[30] Foreign Application Priority Data

Oct. 31, 1990 [KR] Rep. of Korea .............. 90-17583[U]
Jul. 22, 1991 [KR] Rep. of Korea .............. 91-12546[U]

[51] Int. Cl.⁵ .............................................. H04N 5/78
[52] U.S. Cl. .................................... 360/33.1; 358/138
[58] Field of Search ..................... 360/33.1, 32, 9.1, 8, 360/30, 27; 358/138, 167, 37, 310, 323, 335, 11, 12; 375/97, 113

[56] References Cited

U.S. PATENT DOCUMENTS 4,864,424 9/1989 Ochi et al. ........................... 358/330
5,113,265 5/1992 Kobayashi et al. ................. 358/310

Primary Examiner—Edward P. Westin
Assistant Examiner—Que T. Le
Attorney, Agent, or Firm—Robert E. Bushnell

[57] ABSTRACT

A luminance signal playback processing circuit is adapted to an improved VCR and reproduces the video signal recorded on the video tape by the existing VCR for maintaining a compatibility. The luminance signal playback processing circuit detects whether a frequency folding information is inserted in a synchronizing signal included in the reproduced luminance signal, and selects one of the luminance signal processing paths in accordance with the result of the detected frequency folding information, when the video signal recorded by the existing VCR is reproduced in the improved VCR to which the circuit of present invention is applied, thereby reproducing video signals recorded on the video tape by the existing VCR without deteriorating a picture quality.

10 Claims, 4 Drawing Sheets

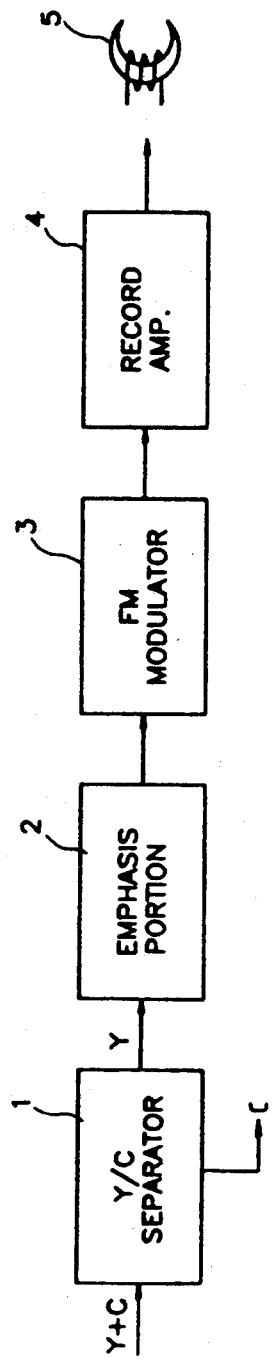
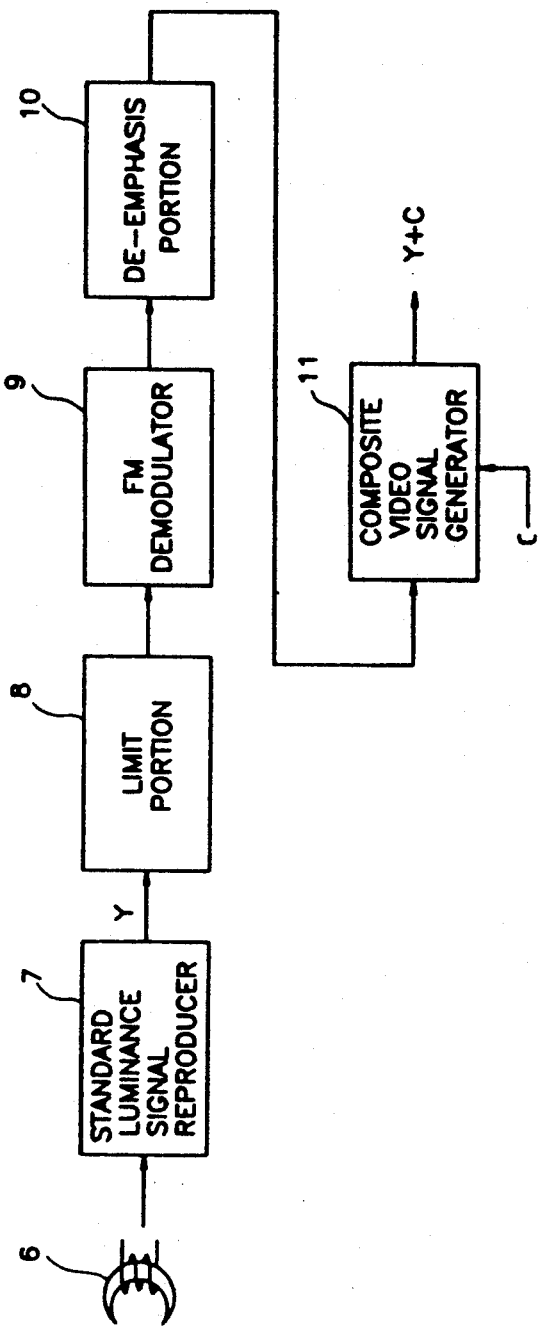
FIG.1A (PRIOR ART)
FIG.1B (PRIOR ART)

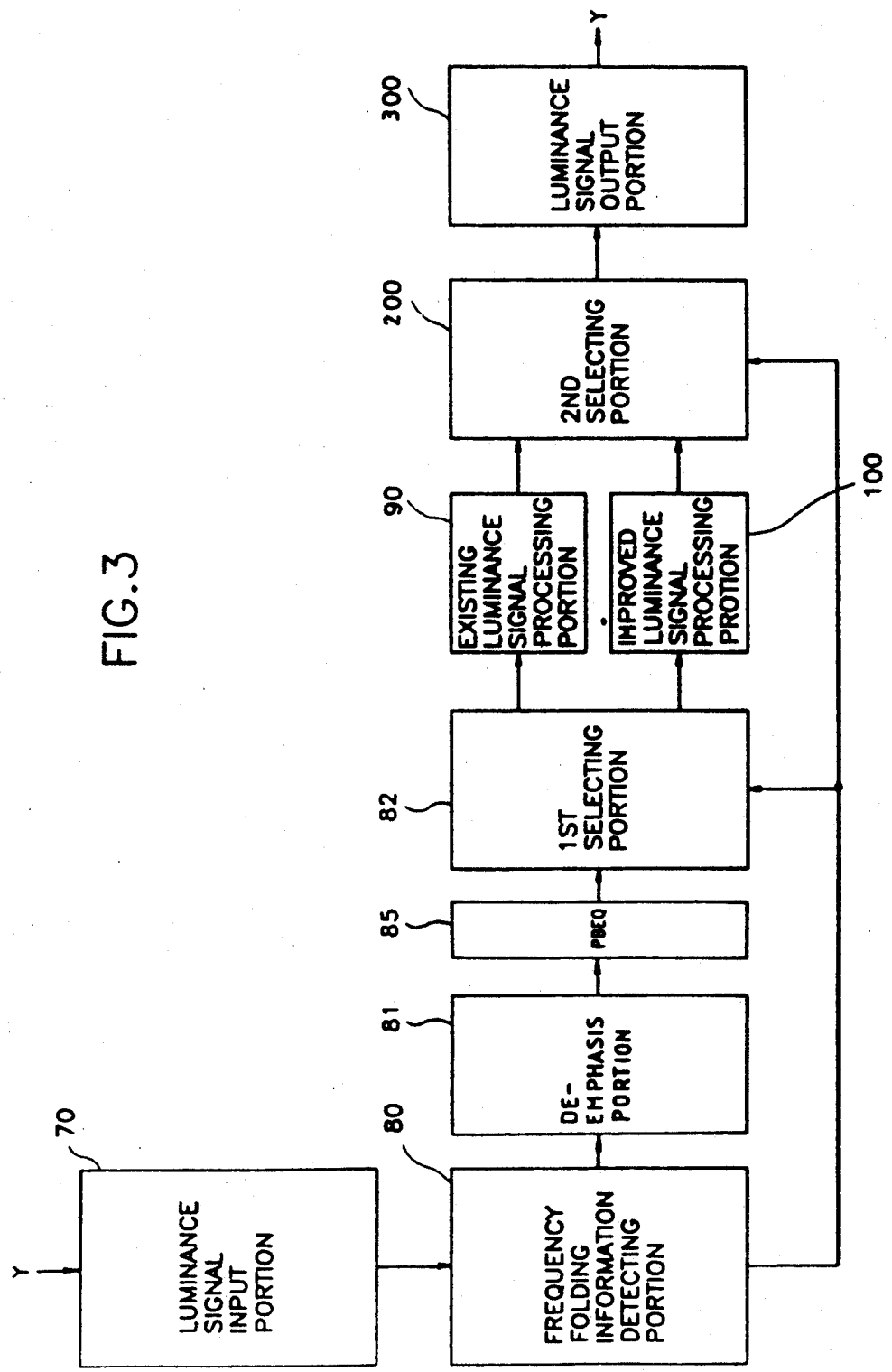

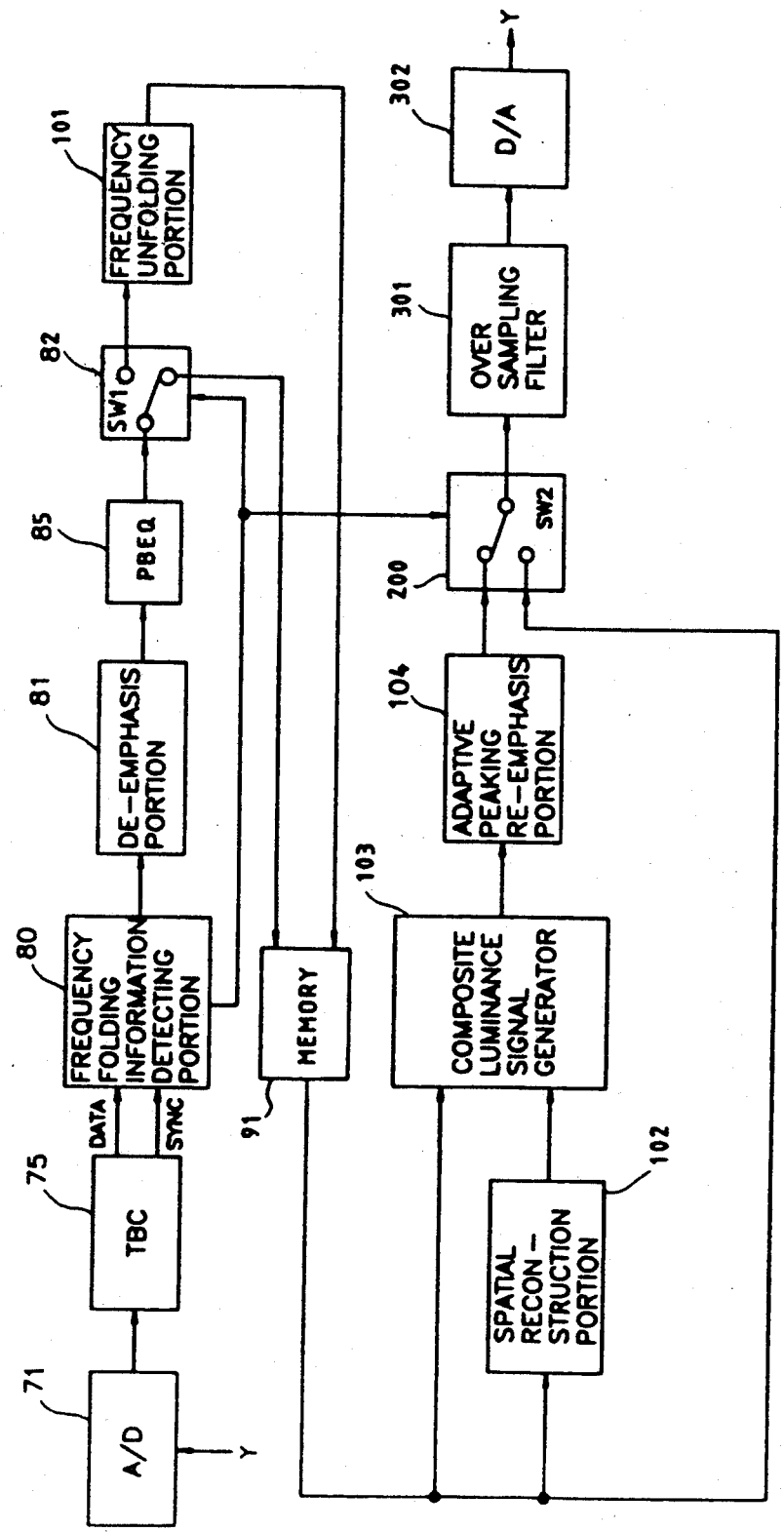

CIRCUIT AND METHOD FOR REPRODUCING A LUMINANCE SIGNAL COMPATIBLY BETWEEN DIFFERENT VIDEO SYSTEMS

BACKGROUND OF THE INVENTION

The present invention relates to a circuit and the method for reproducing a luminance signal compatibly between video cassette recorders(VCR) adopting different video signal recording and reproducing systems. More particularly, the present invention relates to a circuit and method for compatibly reproducing a luminance signal recorded on a video cassette tape by conventional video signal recording and reproducing apparatuses in such a system as is described in detail in the U.S. patent application Ser. No. 07/569,029 on the invention titled "AN IMPROVED VIDEO SIGNAL RECORDING SYSTEM", filed Aug. 17, 1990 by the same Applicant, now U.S. Pat. No. 5,113,262.

Generally, in a conventional video signal recording and reproducing apparatus, as shown in FIG. 1A and FIG. 1B, when a composite video signal is recorded on a video cassette tape, the luminance signal separated in Y/C separator 1 is supplied to an emphasis portion 2, thereby emphasizing the luminance high frequency components. When the composite video signal is reproduced from the video cassette tape, the luminance signal is processed by a de-emphasis portion 10 in order to restore the luminance high frequency components emphasized during recording the video signal to the original signal. This process will be described below with reference to FIG. 1A and FIG. 1B.

Referring to FIG. 1A, if a composite video signal is inputted to a recording circuit of an existing video signal recording and reproducing apparatus which will be referred to as a video cassette tape recorder (hereinafter, a VCR), the composite video signal is separated into the luminance and chrominance signal in Y/C separator 1 and the separated luminance signal is emphasized in an emphasis portion 2. Then, the emphasized luminance signal is supplied to FM modulator 3.

This FM modulated signal in FM modulator 3 is amplified in a record amplifier 4 and recorded by a recording head 5 on a video cassette tape. At this time, although not shown in FIG. 1A, the chrominance signal separated in Y/C separator 1 is processed in a chrominance signal processor, is mixed with the luminance signal, and is recorded.

Referring to FIG. 1B, a reproducing circuit of a conventional VCR reproduces a composite video signal recorded on the video cassette tape through a playback head 6 and supplies the reproduced composite video signal to a standard luminance signal reproducer 7, thereby reproducing the luminance signal. The reproduced luminance signal Y is limited by a limit portion 8 and then demodulated in FM demodulator 9. This demodulated luminance signal is also supplied to a de-emphasis portion 10 in order to restore the luminance signal emphasized in the recording circuit. Then, a composite video signal generator 11 outputs a composite video signal Y+C by mixing the chrominance signal C outputted from a chrominance signal reproducer which is not shown in FIG. 1B, and the de-emphasized luminance signal.

However, as shown in FIG. 2A and FIG. 2B, a recording circuit and a reproducing circuit of an improved video signal recording and reproducing apparatus to which the circuit of the present invention is applied are different from the existing record and playback processing circuits shown in FIG. 1A and FIG. 1B. That is, in the VCR to which the present invention is applied, when a composite video signal is recorded on a video cassette tape, the high frequency luminance signal to be folded passes through an adaptive de-emphasis portion 23 and then is frequency folded. Next, during reproducing the luminance signal is frequency-unfolded and then passes through an adaptive re-emphasis portion 34, This process will be described below with reference to FIGS. 2A and 2B.

Referring to FIG. 2A, a composite video signal Y+C is separated into luminance signal Y and chrominance signal C in Y/C separator 22 via A/D converter 21. This separated luminance signal Y is supplied to an adaptive de-emphasis portion 23. Then, a frequency folding portion 24 receives the de-emphasized signal, and outputs a frequency-folded signal. Next, a frequency folding information recording portion 25 inserts frequency folding information in the horizontal synchronizing signal Hsync in order to separate the folded frequency during the playback processing. Next, this luminance signal on which the frequency folding information is inserted is D/A converted in D/A converter 26, and then is recorded by a recording head 27 on a video cassette tape together with a chrominance signal through sequential processes not shown in FIG. 2A.

Referring to FIG. 2B, a playback processing circuit of an improved video signal recording and reproducing apparatus to which the circuit of the present invention is applied reproduces a luminance signal Y in a standard luminance signal playback portion 29 via a playback head 28. For the purpose of restoring the pre-emphasized luminance signal during the record processing which is not shown in FIG. 2A, the high frequency components of the luminance signals are de-emphasized in a de-emphasis portion 30. The de-emphasized luminance signal is FM demodulated in an FM demodulator not shown in FIG. 2B, and then the FM demodulated luminance signal is inputted to A/D converter 31. Next, a frequency folding information detecting portion 32 receives the A/D converted signal and detects the frequency folding information inserted in the frequency folding information recording portion 25 during the record processing of the video signal.

Next, a frequency unfolding portion 33 unfolds the frequency folded signal in accordance with the frequency folding information detected in the frequency folding information detecting portion 32. This unfolded signal is then restored to the original signal via an adaptive re-emphasis portion 34. D/A converter 35 then receives the restored signal and outputs the desired luminance signal. Next, a composite video signal generator 36 outputs a composite video signal Y+C after mixing a chrominance signal outputted from a chrominance signal processor for processing the reproduced chrominance signal (not shown in FIG. 2B), and the luminance signal.

Thus, when a video signal recorded by a record processing circuit in the existing VCR as shown in FIG. 1A is reproduced by a playback processing circuit in the improved VCR as shown in FIG. 2B, the recorded video signal could not be restored to the original signal during the playback processing because the recorded video signal during the record processing is unfolded in the frequency unfolding portion 33 and then passes through the improved video signal playback process.

Consequently, when the video signal recorded by the existing VCR is reproduced in the system which is disclosed in the aforesaid U.S. patent application No. 07/569,029, the picture quality having the same resolution as that of originally recorded video signal is not obtained, thereby resulting in the problem that perfect compatibility between the different video signal recording and reproducing systems is not maintained.

SUMMARY OF THE INVENTION

It is an object of the present invention to provide a circuit for reproducing a luminance signal compatibly by adding a circuit for reproducing the video signal recorded by a different video signal recording system, maintaining a compatibility to a playback processing circuit of an improved VCR to which the circuit of the present invention is applied, thereby displaying the video signal recorded on a video tape by different video signal recording systems, maintaining the resolution of a picture of the recording process.

Therefore, in order to achieve the above object, there is provided a circuit for reproducing a luminance signal compatibly between different video systems adapted to a video signal playback apparatus for reproducing the video signal of a predetermined full bandwidth previously recorded on a recording medium with a limited bandwidth, in a video signal recording and reproducing apparatus having an adaptive de-emphasis portion, a frequency folding portion and a frequency folding information recording portion for recording a luminance signal and a synchronizing signal, and a frequency folding information detecting portion, a frequency unfolding portion and an adaptive re-emphasis portion for reproducing the luminance signal and the synchronizing signal, wherein the aforesaid circuit comprises:

a luminance signal input portion to which a luminance signal is inputted;

a frequency folding information detecting portion which receives the luminance signal and the synchronizing signal supplied from the luminance signal input portion and detects whether frequency folding information is loaded on the synchronizing signal;

a first selecting portion which selects and supplies the luminance signal in accordance with the result of the frequency folding information detecting portion;

an improved luminance signal processing portion for processing the luminance signal by an improved video signal processing system when the frequency folding information detecting portion detects the frequency folding information;

an existing luminance signal processing portion for processing the luminance signal by an existing video signal processing system when the frequency folding information detecting portion detects the non-existence of frequency folding information;

a second selecting portion which receives outputs from the improved luminance signal processing portion and the existing luminance signal processing portion and selects one of them in accordance with the result of the frequency folding information detecting portion; and a luminance signal output portion for outputting the luminance signal in accordance with the signal supplied from the second selecting portion.

There is also provided a method for reproducing a luminance signal compatibly between different video systems in reproducing a video signal having a full bandwidth recorded in advance on a recording medium having a limited bandwidth, wherein the method comprises the steps of:

inputting a luminance signal processed in a standard luminance signal reproducer which processes a video signal reproduced from a recording medium via a playback head;

detecting whether frequency folding information is loaded on the inputted luminance signal;

selecting a route of the luminance signal processing routes in accordance with the frequency folding information;

processing the luminance signal in accordance with the selected luminance signal processing route; and selecting and outputting a luminance signal of the processed luminance signals in accordance with the frequency folding information, whereby reproducing the luminance signal of a video tape recorded by an existing video signal recording system compatibly.

BRIEF DESCRIPTION OF THE DRAWINGS

FIG. 1A and FIG. 1B are block diagrams schematically showing a recording circuit and a reproducing circuit of a general video signal recording and reproducing apparatus, respectively;

FIG. 3 is a block diagram schematically showing a circuit of the present invention for reproducing a luminance signal and keeping a compatibility during reproducing between the different video systems; and FIG. 4 is a detailed block diagram of the circuit shown in FIG. 3.

DETAILED DESCRIPTION OF THE PREFERRED EMBODIMENT

Figure 2A:
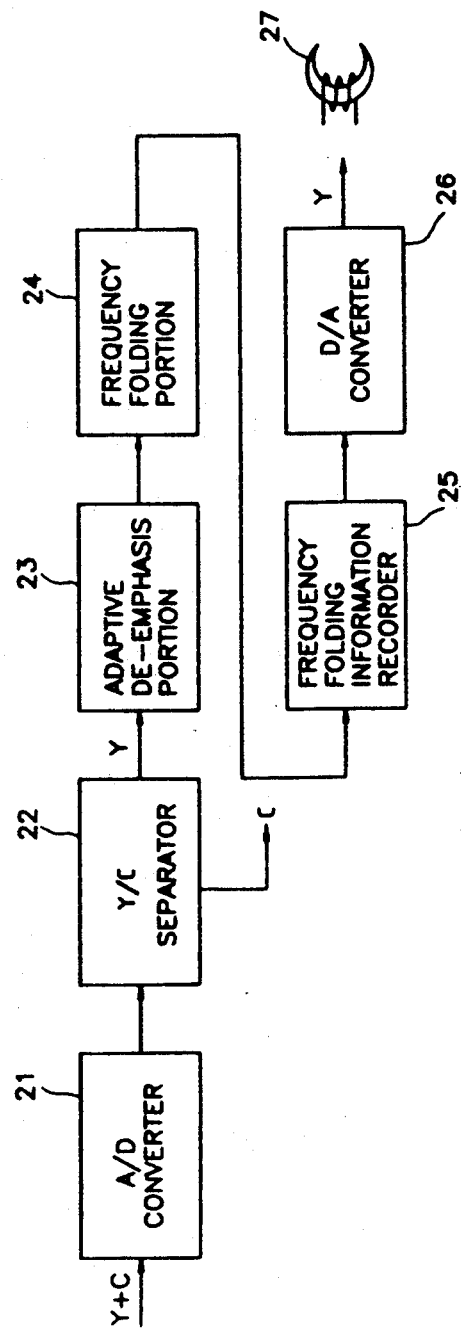
FIG. 2A and FIG. 2B are block diagrams schematically showing a recording circuit and a reproducing circuit of an improved video signal recording and reproducing apparatus to which the circuit of the present invention is applied, respectively.

An embodiment of the present invention will be described below with reference to the attached drawings.

Referring to FIG. 3, in a circuit for reproducing a luminance signal compatibly between the different VCRs according to the present invention, a luminance signal reproduced in a standard luminance playback portion through a playback head from a video tape not shown in FIG. 3 is supplied to a luminance signal input portion 70. The luminance signal input portion 70 receives the luminance signal Y. The luminance signal Y is A/D converted and is corrected along a time axis by the luminance signal input portion 70. Next, a frequency folding information detecting portion 80 detects whether a frequency folding information is loaded on the luminance signal outputted from the luminance signal input portion 70. Next, de-emphasis portion 81 might be installed at the pre-stage of the luminance signal input portion 70, however in the present embodiment, de-emphasis portion 81 is installed at the post-stage of the frequency folding detecting portion 80. Then, the luminance high frequency components outputted from the frequency folding information detecting portion 80 are de-emphasized in the de-emphasis portion 81. The de-emphasized luminance signal is supplied to a first selecting portion 82 via a playback equalizer 85. The first selecting portion 82 selects and outputs the de-emphasized luminance signal to an improved luminance signal processing portion 100 when the frequency folding information is detected in the frequency folding information detecting portion 80, while the first selecting portion 82 selects and outputs the de-emphasized luminance signal to an existing luminance signal processing portion 90 when the frequency folding information is not detected in the frequency folding information detecting portion 80. Next, the signal processed by the improved luminance signal processing portion 100 or the existing luminance signal processing portion 90 is supplied to a second selecting portion 200. The second selecting portion 200 selects and outputs one of the luminance signals supplied from the improved luminance signal processing portion 100 and the existing luminance signal processing portion 90 in accordance with the result from the frequency folding information detecting portion 80. Next, a luminance signal output portion 300 receives the signal outputted from the second selecting portion 200 and outputs the luminance signal.

The above circuit for reproducing the luminance signal compatibly between the different video systems according to the present invention is operated as described below in detail with reference to FIG. 4.

Referring to FIG. 4, when a video signal recorded by the existing VCR is reproduced in an improved VCR provided with the circuit of the present invention, the reproduced video signal is separated into a luminance signal Y in a standard luminance signal playback portion not shown in FIG. 4. The luminance signal Y is converted into a digital signal in an A/D converter 71. This digitally converted signal is supplied to a time base correction circuit (TBC) 75 and then is corrected along a time axis regularly. Thereafter, both a data signal and a synchronizing signal are supplied to a frequency folding information detecting portion 80. Here, the data signal and the synchronizing signal indicate the luminance signal and the composite synchronizing signal, respectively. The frequency-folding information detecting portion 80 detects whether the frequency folding information is loaded in the composite synchronizing signal or not. Here, the frequency folding information may be a pulse in which the inserting position of the pulse may be slightly altered for each field of the luminance signal. The pulse may be any pulse having a form such as an impulse or a rectangular wave pulse. Also, the frequency folding information may be a code word in which the inserting position inserted on the luminance signal is fixed.

The luminance signal supplied from the frequency folding information detecting portion 80 is the pre-emphasized signal during the record processing, and thus the luminance high frequency components are attenuated in a de-emphasis portion 81.

Figure 2B:
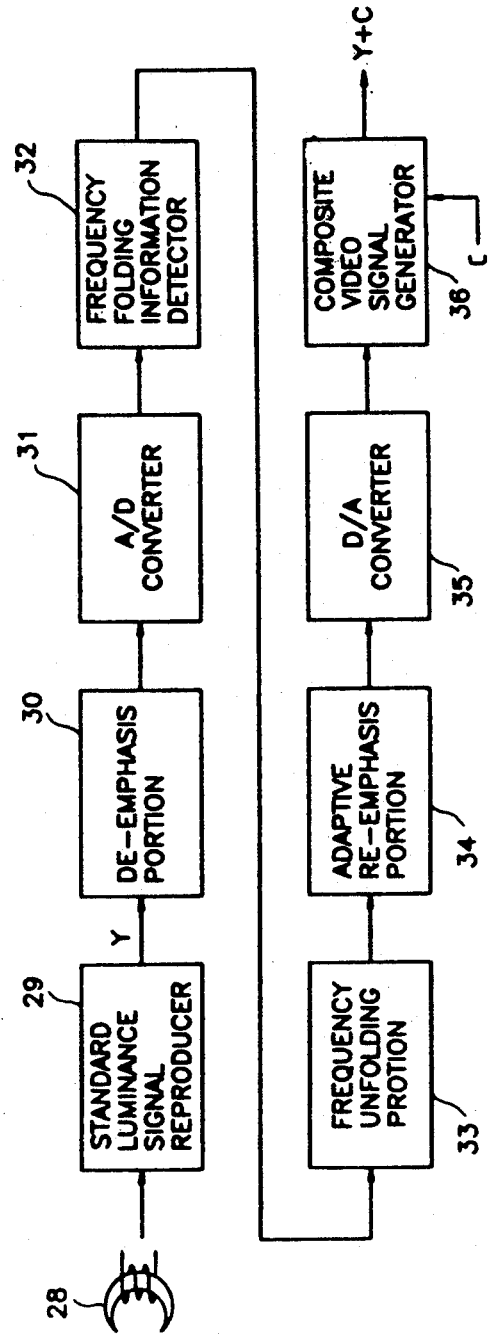

This de-emphasis portion 81 in the U.S. patent application No. 07/569,029, filed Aug. 17, 1990 by the same applicant is located at the pre-stage of an A/D converter 31 as shown in FIG. 2B. However, the de-emphasis portion 81 in the present invention is located at the post-stage of a frequency folding information detecting portion 80. The de-emphasized luminance signal in the de-emphasis portion 81 is supplied to a first selecting portion 82 via a playback equalizer 85. The first selecting portion 82 selects in accordance with the result of the frequency folding information detecting portion 80, one playback processing route through which the luminance signal supplied from the de-emphasis portion 81 via a playback equalizer 85 will be processed.

When the luminance signal input to the first selecting portion 82 is a luminance signal recorded by the existing VCR, the luminance signal is supplied to a memory 91, which attenuates a noise in a still picture. Thereafter, the attenuated luminance signal is supplied to one terminal of a second selecting portion 200.

When the luminance signal input to the first selecting portion 82 is a luminance signal recorded by the improved VCR, the luminance signal is supplied to a frequency unfolding portion 101. Here, the existing luminance signal processing portion 90 of FIG. 3 includes the memory 91 as shown in FIG. 4 so that the existing luminance signal processing route is formed, and the improved luminance signal processing portion 100 of FIG. 3 includes the frequency unfolding portion 101, the memory 91, the spatial reconstruction portion 102, the composite luminance signal generator 103 and the adaptive peaking re-emphasis portion 104, so that the improved luminance signal processing route is formed.

Thus, when the luminance signal recorded by the existing VCR is reproduced by the improved VCR, the luminance signal processing circuit according to the present invention detects whether the luminance signal is recorded by the existing VCR or the improved VCR in the frequency folding information detecting portion 80, and decides whether the existing luminance signal processing portion or the improved luminance signal processing portion is selected, by means of the selecting means, in accordance with the result from the frequency folding information detecting portion 80.

Accordingly, when the frequency folding information is detected in the frequency folding information detecting portion 80, the first selecting portion 82 supplies the luminance signal to the frequency unfolding portion 90 in order to process the luminance signal according to the improved luminance signal processing path.

The frequency unfolding portion 101 unfolds the frequency folded video signal and supplies the unfolded luminance signal to a memory 91 for removing a frequency folding carrier in a still picture and to a spatial reconstruction portion 102 for removing a frequency folding carrier in a moving picture and reconstructing an edge correction signal. Thereafter, the luminance signals supplied from the memory 91 and the spatial reconstruction portion 102 are supplied to a composite luminance signal generator 103. The composite luminance signal generator 103 mixes the signals supplied from the memory 91 for performing the function of the frame averaging and the spatial reconstruction portion 102 in accordance with a motion data of a motion signal separated from a chrominance signal processing portion and a motion signal processing portion not shown in FIG. 4, and supplies the mixed signal to an adaptive peaking re-emphasis portion 104.

The adaptive peaking re-emphasis portion 104 restores the luminance high frequency components to the original signal and supplies the restored signal to the other terminal of a second selecting portion 200.

The second selecting portion 200 selects one of the signals supplied from the memory device 91 and the adaptive peaking re-emphasis portion 104 in accordance with the detected frequency folding information signal supplied from the frequency folding information detecting portion 80, and supplies the selected signal to a luminance signal output portion 300. The luminance signal output portion 300 comprises an oversampling filter 301 and a D/A converter 302 and outputs the analog converted signal. The oversampling filter 301 increases a sampling speed in order to facilitate to convert the digital signal into the analog signal.

In this embodiment, the circuit for reproducing a luminance signal compatibly between the different video systems is described with respect to only the luminance signal processing circuit. However, the chrominance signal processing portion and the motion signal processing portion relating to the circuit for maintaining a compatibility during the playback processing are omitted in the description of this embodiment because the chrominance signal processing portion and the motion signal processing portion are the same as the signal processing routes of the improved video signal recording and reproducing system. That is, in this embodiment, only the luminance signal processing route is described in relation to detecting the frequency folding information inserted in a synchronizing signal included in the luminance signal of the composite video signal reproduced from the video tape.

As described above, a circuit for reproducing a luminance signal compatibly between the different video systems is connected to a luminance signal processing portion in the improved VCR to which the circuit of the present invention is applied, thereby reproducing the video signal recorded by the existing VCR compatibly. Accordingly, the video signal recorded by the different VCR can be reproduced in the improved VCR compatibly without deteriorating resolution of picture image recorded during the recording processing.

What is claimed is:

1. A circuit for reproducing a luminance signal compatibly between different video systems adapted to a video signal playback apparatus for reproducing the video signal of a predetermined full bandwidth previously recorded on a recording medium with a limited bandwidth, in a video signal recording and reproducing apparatus having an adaptive de-emphasis portion, a frequency folding portion and a frequency folding information recording portion for recording a luminance signal and a synchronizing signal, and having a frequency folding information detecting portion, a frequency unfolding portion and an adaptive re-emphasis portion for reproducing the luminance signal and the synchronizing signal, said circuit comprising:

a luminance signal input portion to which a luminance signal is inputted;

a frequency folding information detecting portion which receives the luminance signal and the synchronizing signal supplied from the luminance signal input portion and detects whether a frequency folding information is loaded on the synchronizing signal;

a first selecting portion which selects and supplies the luminance signal in accordance with the result of the frequency folding information detecting portion;

an improved luminance signal processing portion for processing the luminance signal by an improved video signal processing system when the frequency folding information detecting portion detects the frequency folding information;

an existing luminance signal processing portion for processing the luminance signal by an existing video signal processing system when the frequency folding information detecting portion detects the non-existence of the frequency folding information;

a second selecting portion which receives outputs from the improved luminance signal processing portion and the existing luminance signal processing portion and selects one of them in accordance with the result of the frequency folding information detecting portion; and a luminance signal output portion for outputting the luminance signal supplied from the second selecting portion.

2. A circuit for reproducing a luminance signal compatibly between different video systems as claimed in claim 1, wherein, when a de-emphasis portion for attenuating the high frequency component of the luminance signal is not installed at a pre-stage of said luminance signal input portion, said de-emphasis portion is connected between said frequency folding detecting portion and said first selecting portion.

3. A circuit as claimed in claim 1, wherein said improved luminance signal processing portion comprises a frequency unfolding portion for unfolding the frequency folded luminance signal supplied from the first selecting portion;

a composite luminance signal generator for receiving the output signal which is supplied from a memory device for removing a frequency folding carrier in a still picture of the frequency unfold luminance signal and the output signal which is supplied from a spatial reconstruction portion for removing a frequency folding carrier in a moving picture and reconstructing an edge correction signal, and for generating a composite luminance signal in accordance with a motion data included in the video signal; and an adaptive peaking re-emphasis portion for restoring the high frequency components of the luminance signal supplied from the composite luminance signal generator to an original signal.

4. A circuit as claimed in claim 3, wherein said existing luminance signal processing portion comprises a memory device for receiving the de-emphasized luminance signal supplied from said first selecting portion and for reducing a noise.

5. A circuit as claimed in claim 1, wherein said first selecting portion is composed of a switching device or a multiplexer.

6. A circuit as claimed in claim 5, wherein said second selecting portion is composed of a multiplexer.

7. A method for reproducing a luminance signal compatibly between different video systems in reproducing a video signal having a predetermined full bandwidth recorded in advance on a recording medium having a limited bandwidth, said method comprising the steps of:

inputting a luminance signal processed in a standard luminance signal reproducer which processes a video signal reproduced from a recording medium via a playback head;

detecting whether frequency folding information is loaded on the inputted luminance signal;

selecting a route between the luminance signal processing routes in accordance with the frequency folding information;

processing the luminance signal in accordance with the selected luminance signal processing route; and selecting and outputting a luminance signal between the processed luminance signals in accordance with the frequency folding information, whereby the luminance signal on a video tape recorded by an existing video signal recording system is reproduced compatibly.

8. A method as claimed in claim 7, wherein, when the frequency folding information is detected in said frequency folding information detecting procedure, said luminance signal processing procedure comprises the steps of:

unfolding a high frequency component of the luminance signal folded into a low frequency component of the luminance signal;

generating a composite luminance signal after receiving a signal in which a frequency folding carrier is removed from said unfolded signal in a still picture, and a signal in which a frequency folding carrier is removed from said unfolded signal in a moving picture and which passes through a spatial reconstruction portion for reconstructing an edge correction signal; and re-emphasizing of adaptive-peaking for restoring said high frequency component of said composite luminance signal to an original signal.

9. A method as claimed in claim 7, wherein said luminance signal processing procedure comprises the step of attenuating a noise through a memory device when the frequency folding information is not detected in said frequency folding information detecting procedure.

10. A method as claimed in claim 7, wherein, when there is no de-emphasizing procedure for attenuating a high frequency component of the reproduced luminance signal prior to said reproduced luminance signal inputting procedure, said de-emphasizing procedure is inserted between said frequency folding information detecting procedure and said luminance signal processing route selecting procedure.

* * * * *